US010644383B2

(12) United States Patent
Da Costa Bras Lima et al.

(10) Patent No.: US 10,644,383 B2
(45) Date of Patent: May 5, 2020

(54) WRISTWATCH ANTENNAS

(71) Applicant: Apple Inc., Cupertino, CA (US)

(72) Inventors: Eduardo Jorge Da Costa Bras Lima, Sunnyvale, CA (US); Andrea Ruaro, Copenhagen (DK); Carlo Di Nallo, San Carlos, CA (US); Jayesh Nath, Milpitas, CA (US); Mario Martinis, Cupertino, CA (US); Zheyu Wang, Sunnyvale, CA (US); Mattia Pascolini, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 256 days.

(21) Appl. No.: 15/654,915

(22) Filed: Jul. 20, 2017

(65) Prior Publication Data
US 2018/0090826 A1 Mar. 29, 2018

Related U.S. Application Data

(60) Provisional application No. 62/399,119, filed on Sep. 23, 2016.

(51) Int. Cl.
*H01Q 1/27* (2006.01)
*H04B 1/3827* (2015.01)
(Continued)

(52) U.S. Cl.
CPC ............ *H01Q 1/273* (2013.01); *H01Q 1/24* (2013.01); *H01Q 1/243* (2013.01); *H01Q 1/38* (2013.01);
(Continued)

(58) Field of Classification Search
CPC .......... H01Q 1/273; H01Q 1/38; H01Q 1/243; H01Q 1/521; H04B 1/385; H04M 2201/38
See application file for complete search history.

(56) References Cited

U.S. PATENT DOCUMENTS 6,764,012 B2   7/2004  Connolly et al.
2006/0227058 A1  10/2006  Zellweger et al.
(Continued)

FOREIGN PATENT DOCUMENTS

CN   101958455 A   1/2011
CN   202084632 U   12/2011
(Continued)

OTHER PUBLICATIONS

Dias, Resonant wireless power transmission based on resonant electrical coupling, Diss. Universidade de Aveiro (Portugal), 2016.
(Continued)

*Primary Examiner* — Graham P Smith
*Assistant Examiner* — Jae K Kim
(74) *Attorney, Agent, or Firm* — Treyz Law Group, P.C.; Michael H. Lyons; Tianyi He

(57) ABSTRACT

An electronic device such as a wristwatch may have a housing with metal sidewalls and a dielectric rear wall. The metal sidewalls may form an antenna ground for an antenna. The antenna may include an antenna resonating element formed from conductive traces patterned directly onto an interior surface of the dielectric rear wall. The conductive traces may define a slot at the dielectric rear wall. A coil and a sensor may be mounted to the dielectric rear wall within the slot. Radio-frequency transceiver circuitry may be coupled to the conductive traces and the antenna ground and may transmit and receive radio-frequency signals through the dielectric rear wall using the antenna. Wireless power receiver circuitry may use the coil to receive wireless power signals through the dielectric rear wall. The sensor may emit and/or receive light through a transparent window in the dielectric rear wall.

19 Claims, 11 Drawing Sheets

(51) Int. Cl.
*H01Q 1/38* (2006.01)
*H01Q 1/24* (2006.01)
*H01Q 9/04* (2006.01)
*H01Q 1/52* (2006.01)

(52) U.S. Cl.
CPC ............... *H01Q 1/521* (2013.01); *H01Q 9/04* (2013.01); *H01Q 9/0421* (2013.01); *H04B 1/385* (2013.01); *H04M 2201/38* (2013.01)

(56) References Cited

U.S. PATENT DOCUMENTS

| | | | |
|---|---|---|---|
| 2013/0076573 A1* | 3/2013 | Rappoport | H01Q 1/243 343/702 |
| 2014/0241555 A1* | 8/2014 | Terlizzi | H02J 50/10 381/315 |
| 2015/0270619 A1 | 9/2015 | Zhu et al. | |
| 2016/0013544 A1 | 1/2016 | Lyons et al. | |
| 2016/0036120 A1 | 2/2016 | Sepänniitty et al. | |
| 2016/0054711 A1 | 2/2016 | Fujisawa | |
| 2016/0058375 A1 | 3/2016 | Rothkopf | |
| 2016/0072178 A1* | 3/2016 | Khalifa | H01Q 1/243 343/702 |
| 2016/0349789 A1 | 12/2016 | Lee et al. | |
| 2017/0048991 A1 | 2/2017 | Kim et al. | |
| 2017/0239560 A1* | 8/2017 | Muratov | A63F 13/211 |

FOREIGN PATENT DOCUMENTS

| | | |
|---|---|---|
| CN | 103515696 A | 1/2014 |
| CN | 204809376 U | 11/2015 |
| CN | 205004435 U | 1/2016 |
| WO | 2015187348 | 12/2015 |

OTHER PUBLICATIONS

Su et al., Integrated Metal-Frame Antennas for Smartwatch Wearable Device, IEEE Transactions on Antennas and Propagation, Jul. 2015, pp. 3301-3305, vol. 63, No. 7.

Ehman et al., U.S. Appl. No. 15/234,907, filed Aug. 11, 2016.

* cited by examiner

WRISTWATCH ANTENNAS

This application claims the benefit of provisional patent application No. 62/399,119, filed Sep. 23, 2016, which is hereby incorporated by reference herein in its entirety.

BACKGROUND

This relates to electronic devices, and more particularly, to antennas for electronic devices with wireless communications circuitry.

Electronic devices are often provided with wireless communications capabilities. To satisfy consumer demand for small form factor wireless devices, manufacturers are continually striving to implement wireless communications circuitry such as antenna components using compact structures. At the same time, there is a desire for wireless devices to cover a growing number of communications bands.

Because antennas have the potential to interfere with each other and with components in a wireless device, care must be taken when incorporating antennas into an electronic device. Moreover, care must be taken to ensure that the antennas and wireless circuitry in a device are able to exhibit satisfactory performance over a range of operating frequencies.

It would therefore be desirable to be able to provide improved wireless communications circuitry for wireless electronic devices.

SUMMARY

An electronic device such as a wristwatch may have a housing with metal portions such as metal sidewalls. A display may be mounted on a front face of the device. Light-based components such as light-emitting diodes and detectors may be mounted on a rear face of the device. The rear face of the electronic device may be formed using a dielectric rear housing wall.

The electronic device may include wireless communications circuitry. The wireless communications circuitry may include radio-frequency transceiver circuitry and an antenna. The antenna may include an antenna ground. The antenna ground may be formed using the metal housing sidewalls and/or a conductive layer on a printed circuit board within the electronic device. The antenna may include an antenna resonating element formed from conductive traces that are patterned directly onto an interior surface of the dielectric rear housing wall. The antenna may include a positive antenna feed terminal coupled to the conductive traces and a negative antenna feed terminal coupled to the antenna ground. A short circuit leg may couple the conductive traces to the antenna ground (e.g., to the conductive layer on the printed circuit board or to the metal housing sidewalls). The radio-frequency transceiver circuitry may be coupled to the positive and ground antenna feed terminals and may transmit and receive radio-frequency signals through the dielectric rear housing wall using the antenna.

The conductive traces on the dielectric rear housing wall may define a slot. The conductive traces may form a conductive loop that surrounds the slot and that has opposing first and second ends. The positive antenna feed terminal may be coupled to the first end of the conductive loop whereas the short circuit leg is coupled to the second end of the conductive loop. A coil and one or more sensors may be mounted to the dielectric rear housing wall within the slot. The electronic device may include wireless power receiver circuitry that uses the coil to receive wireless power signals through the dielectric rear housing wall. The sensor may emit and/or receive light through at least one transparent window in the dielectric rear housing wall.

The transceiver circuitry may include cellular telephone transceiver circuitry, wireless local area network transceiver circuitry, and satellite navigation receiver circuitry. The cellular telephone transceiver circuitry may use the antenna resonating element to transmit and receive signals from 700 MHz to 960 MHz and/or in other cellular telephone communications bands through the dielectric rear wall of the housing. The wireless local area network transceiver circuitry may use the antenna resonating element to transmit and receive wireless local area network signals through the dielectric rear wall of the housing. The satellite navigation receiver circuitry may use the antenna resonating element to receive satellite navigation signals through the dielectric rear wall of the housing. The antenna may be used to cover any other frequencies if desired.

DETAILED DESCRIPTION

Figure 1:
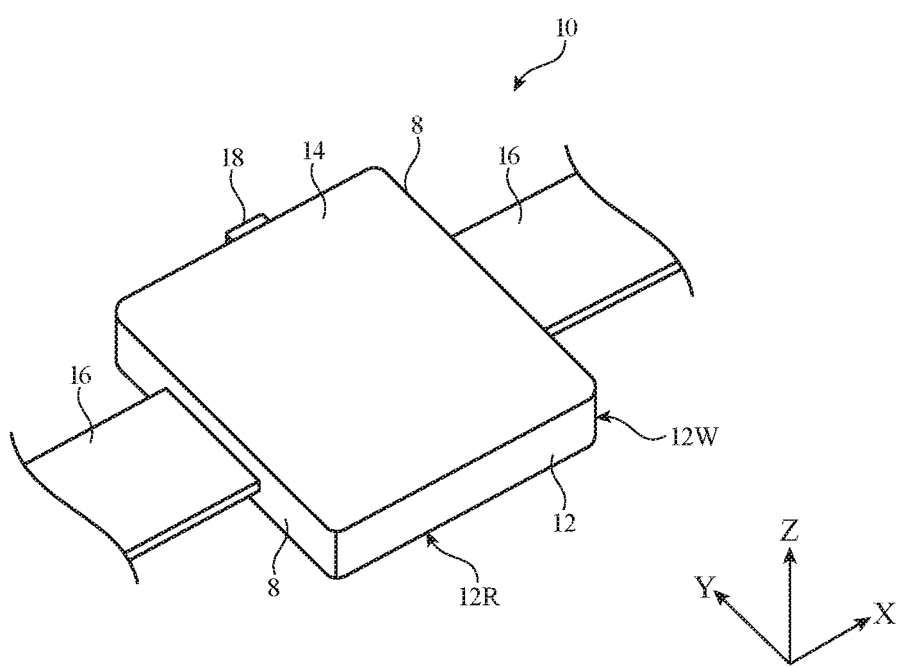
FIG. 1 is a front perspective view of an illustrative electronic device in accordance with an embodiment.

An electronic device such as electronic device 10 of FIG. 1 may be provided with wireless circuitry. The wireless circuitry may include antennas. Antennas such as cellular telephone antennas and wireless local area network and satellite navigation system antennas may be formed from electrical components such antenna resonating element traces and device housing structures.

Electronic device 10 may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a wristwatch. Other configurations may be used for device 10 if desired. The example of FIG. 1 is merely illustrative.

In the example of FIG. 1, device 10 includes a display such as display 14. Display 14 has been mounted in a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.). Housing 12 may have metal sidewalls such as sidewalls 12W or sidewalls formed from other materials. Examples of metal materials that may be used for forming sidewalls 12W include stainless steel, aluminum, silver, gold, metal alloys, or any other desired conductive material.

Display 14 may be formed at the front side (face) of device 10. Housing 12 may have a rear housing wall such as rear wall 12R that opposes front face of device 10. Housing sidewalls 12W may surround the periphery of device 10 (e.g., housing sidewalls 12W may extend around peripheral edges of device 10). Rear housing wall 12R may be formed from dielectric. Examples of dielectric materials that may be used for forming rear housing wall 12R include plastic, glass, sapphire, ceramic, wood, polymer, combinations of these materials, or any other desired dielectrics. Rear housing wall 12R and/or display 14 may extend across some or all of the length (e.g., parallel to the x axis of FIG. 1) and width (e.g., parallel to the y axis) of device 10. Housing sidewall 12W may extend across some or all of the height of device 10 (e.g., parallel to z axis).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies.

Display 14 may be protected using a display cover layer. The display cover layer may be formed from a transparent material such as glass, plastic, sapphire or other crystalline dielectric materials, ceramic, or other clear materials. The display cover layer may extend across substantially all of the length and width of device 10, for example.

Device 10 may include buttons such as button 18. There may be any suitable number of buttons in device 10 (e.g., a single button, more than one button, two or more buttons, five or more buttons, etc. Buttons may be located in openings in housing 12 (e.g., in side wall 12W or rear wall 12R) or in an opening in display 14 (as examples). Buttons may be rotary buttons, sliding buttons, buttons that are actuated by pressing on a movable button member, etc. Button members for buttons such as button 18 may be formed from metal, glass, plastic, or other materials. Button 18 may sometimes be referred to as a crown in scenarios where device 10 is a wristwatch device.

Device 10 may, if desired, be coupled to a strap such as strap 16. Strap 16 may be used to hold device 10 against a user's wrist (as an example). In the example of FIG. 1, strap 16 is connected to opposing sides 8 of device 10. Housing walls 12W on sides 8 of device 10 may include attachment structures for securing strap 16 to housing 12 (e.g., lugs or other attachment mechanisms). Configurations that do not include straps may also be used for device 10.

Figure 2:
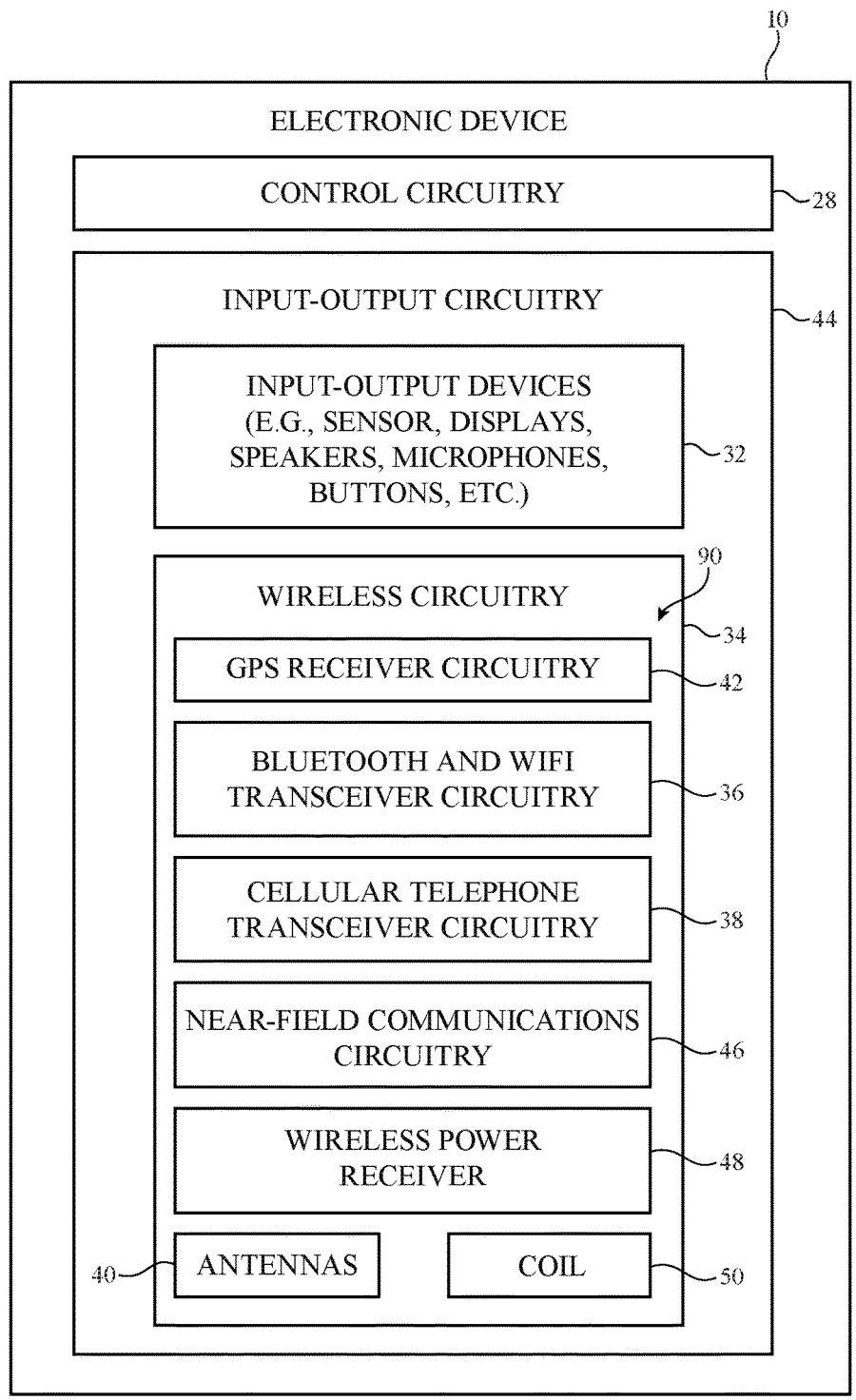
FIG. 2 is a schematic diagram of an illustrative electronic device in accordance with an embodiment.

A schematic diagram showing illustrative components that may be used in device 10 is shown in FIG. 2. As shown in FIG. 2, device 10 may include control circuitry such as storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. This processing circuitry may be based on one or more microprocessors, microcontrollers, digital signal processors, application specific integrated circuits, etc.

Storage and processing circuitry 28 may be used to run software on device 10, such as internet browsing applications, voice-over-internet-protocol (VOIP) telephone call applications, email applications, media playback applications, operating system functions, etc. To support interactions with external equipment, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, cellular telephone protocols, MIMO protocols, antenna diversity protocols, etc.

Input-output circuitry 44 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices 32 may include touch screens, displays without touch sensor capabilities, buttons, scrolling wheels, touch pads, key pads, keyboards, microphones, cameras, buttons, speakers, status indicators, light sources, audio jacks and other audio port components, digital data port devices, light sensors, light-emitting diodes, motion sensors (accelerometers), capacitance sensors, proximity sensors, magnetic sensors, force sensors (e.g., force sensors coupled to a display to detect pressure applied to the display), etc.

Input-output circuitry 44 may include wireless circuitry 34. Wireless circuitry 34 may include coil 50 and wireless power receiver 48 for receiving wirelessly transmitted power from a wireless power adapter. To support wireless communications, wireless circuitry 34 may include radio-frequency (RF) transceiver circuitry formed from one or more integrated circuits, power amplifier circuitry, low-noise input amplifiers, passive RF components, one or more antennas such as antennas 40, transmission lines, and other circuitry for handling RF wireless signals. Wireless signals can also be sent using light (e.g., using infrared communications).

Wireless circuitry 34 may include radio-frequency transceiver circuitry 90 for handling various radio-frequency communications bands. For example, circuitry 34 may include transceiver circuitry 36, 38, 42, and 46. Transceiver circuitry 36 may be wireless local area network transceiver circuitry that may handle 2.4 GHz and 5 GHz bands for WiFi® (IEEE 802.11) communications and that may handle the 2.4 GHz Bluetooth® communications band. Circuitry 34 may use cellular telephone transceiver circuitry 38 for handling wireless communications in frequency ranges such as a low communications band from 700 to 960 MHz, a midband from 1400 MHz or 1500 MHz to 2170 MHz (e.g., a midband with a peak at 1700 MHz), and a high band from 2170 or 2300 to 2700 MHz (e.g., a high band with a peak at 2400 MHz) or other communications bands between 700 MHz and 2700 MHz or other suitable frequencies (as examples). Circuitry 38 may handle voice data and non-voice data. Wireless communications circuitry 34 can include circuitry for other short-range and long-range wireless links if desired. For example, wireless communications circuitry 34 may include 60 GHz transceiver circuitry, circuitry for receiving television and radio signals, paging system transceivers, near field communications (NFC) transceiver circuitry 46 (e.g., an NFC transceiver operating at 13.56 MHz or other suitable frequency), etc. Wireless circuitry 34 may include satellite navigation system circuitry such as global positioning system (GPS) receiver circuitry 42 for receiving GPS signals at 1575 MHz or for handling other satellite positioning data. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless circuitry 34 may include antennas 40. Antennas 40 may be formed using any suitable antenna types. For example, antennas 40 may include antennas with resonating elements that are formed from loop antenna structures, patch antenna structures, inverted-F antenna structures, slot antenna structures, planar inverted-F antenna structures, helical antenna structures, monopole antennas, dipole antenna structures, hybrids of these designs, etc. Different types of antennas may be used for different bands and combinations of bands. For example, one type of antenna may be used in forming a local wireless link antenna whereas another type of antenna is used in forming a remote wireless link antenna. If desired, space may be conserved within device 10 by using a single antenna to handle two or more different communications bands. For example, a single antenna 40 in device 10 may be used to handle communications in a WiFi® or Bluetooth® communication band at 2.4 GHz, a GPS communications band at 1575 MHz, and one or more cellular telephone communications bands such as a low cellular telephone band at 700-960 MHz.

However, in practice, the general size required for the antenna increases as the desired frequency for operation decreases (i.e., as the corresponding wavelength increases). In addition, space is at a premium in compact electronic devices such as device 10 (e.g., especially as the demand for smaller and more aesthetically pleasing device form factors increases). If care is not taken, it can be difficult to be able to provide compact electronic devices with satisfactory antenna coverage in all communications bands of interest, particularly for relatively low frequencies (i.e., relatively long wavelengths) such as low band cellular telephone frequencies at 700-960 MHz.

Figure 3:
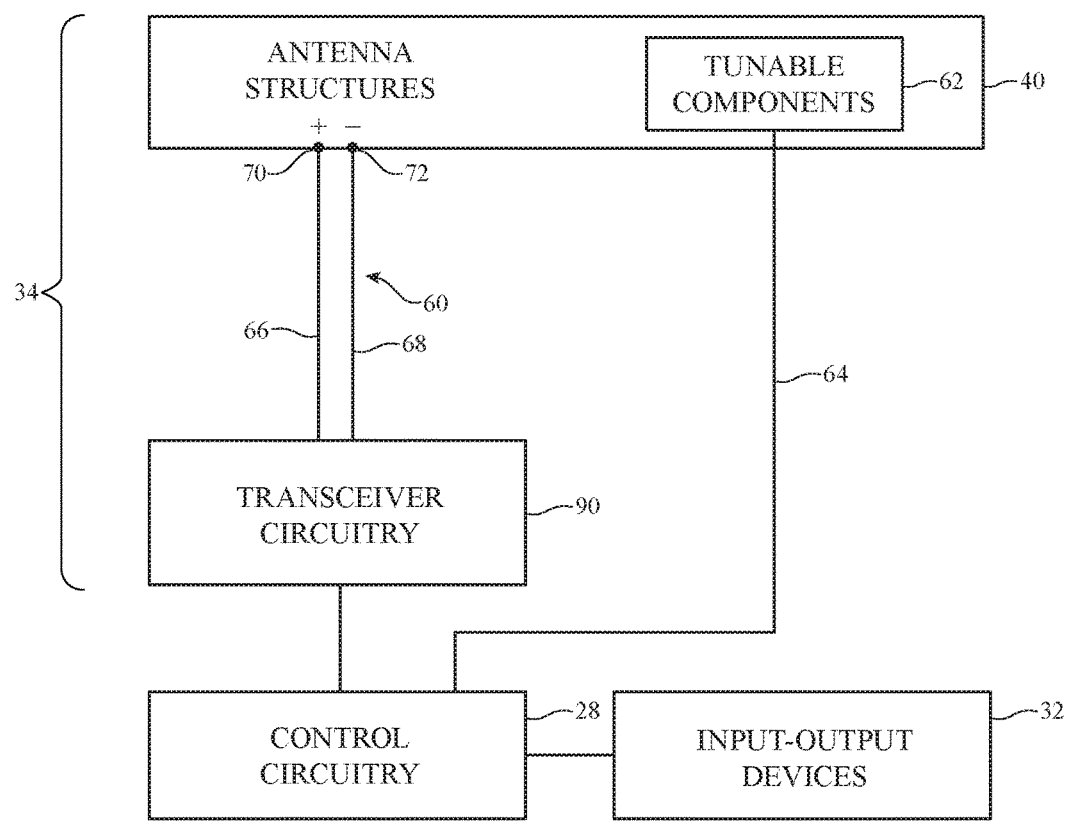
FIG. 3 is a diagram of illustrative wireless circuitry in an electronic device in accordance with an embodiment.

FIG. 3 is a diagram showing how transceiver circuitry 90 in wireless circuitry 34 may be coupled to antenna structures 40 using paths such as path 60. Wireless circuitry 34 may be coupled to control circuitry 28. Control circuitry 28 may be coupled to input-output devices 32. Input-output devices 32 may supply output from device 10 and may receive input from sources that are external to device 10.

To provide antenna structures 40 with the ability to cover communications frequencies of interest, antenna structures 40 may be provided with circuitry such as filter circuitry (e.g., one or more passive filters and/or one or more tunable filter circuits). Discrete components such as capacitors, inductors, and resistors may be incorporated into the filter circuitry. Capacitive structures, inductive structures, and resistive structures may also be formed from patterned metal structures (e.g., part of an antenna). If desired, antenna structures 40 may be provided with adjustable circuits such as tunable components 62 to tune antennas over communications bands of interest. Tunable components 62 may include tunable inductors, tunable capacitors, or other tunable components. Tunable components such as these may be based on switches and networks of fixed components, distributed metal structures that produce associated distributed capacitances and inductances, variable solid state devices for producing variable capacitance and inductance values, tunable filters, or other suitable tunable structures.

During operation of device 10, control circuitry 28 may issue control signals on one or more paths such as path 64 that adjust inductance values, capacitance values, or other parameters associated with tunable components 62, thereby tuning antenna structures 40 to cover desired communications bands.

Path 60 may include one or more radio-frequency transmission lines. As an example, signal path 60 of FIG. 3 may be a transmission line having first and second conductive paths such as paths 66 and 68, respectively. Path 66 may be a positive signal line and path 68 may be a ground signal line. Lines 66 and 68 may form parts of a coaxial cable, a stripline transmission line, and/or a microstrip transmission line (as examples). A matching network formed from components such as inductors, resistors, and capacitors may be used in matching the impedance of antenna structures 40 to the impedance of transmission line 60. Matching network components may be provided as discrete components (e.g., surface mount technology components) or may be formed from housing structures, printed circuit board structures, traces on plastic supports, etc. Matching network components may, for example, be interposed on line 60. The matching network components may be adjusted using control signals received from control circuitry 28 if desired. Components such as these may also be used in forming filter circuitry in antenna structures 40.

Transmission line 60 may be directly coupled to an antenna resonating element and ground for antenna 40 or may be coupled to near-field-coupled antenna feed structures that are used in indirectly feeding a resonating element for antenna 40. As an example, antenna structures 40 may form an inverted-F antenna, a loop antenna, a patch antenna, a slot antenna, or other antenna having an antenna feed with a positive antenna feed terminal such as terminal 70 and a ground antenna feed terminal such as ground antenna feed terminal 72. Positive transmission line conductor 66 may be coupled to positive antenna feed terminal 70 and ground transmission line conductor 68 may be coupled to ground antenna feed terminal 72. If desired, antenna 40 may include an antenna resonating element that is indirectly fed using near-field coupling. In a near-field coupling arrangement, transmission line 60 is coupled to a near-field-coupled antenna feed structure that is used to indirectly feed antenna structures such as the antenna resonating element. This example is merely illustrative and, in general, any desired antenna feeding arrangement may be used.

Figure 4:
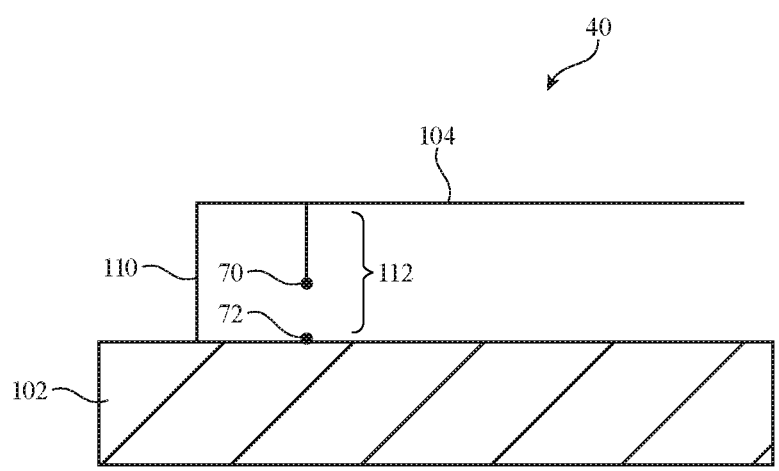
FIG. 4 is a diagram of an illustrative inverted-F antenna structure in accordance with an embodiment.

In one suitable arrangement, antenna 40 may be formed using an inverted-F antenna structure (e.g., a planar inverted-F antenna structure). An illustrative inverted-F antenna structure that may be used for forming antenna 40 is shown in FIG. 4. As shown in FIG. 4, antenna 40 may include an antenna resonating element 104 and antenna ground (ground plane) 102. Antenna resonating element 104 may one or more resonating element arms. The length or perimeter of antenna resonating element 104 may be selected so that antenna 40 resonates at desired operating frequencies. For example, the length or perimeter of arm 104 may be a quarter of a wavelength at a desired operating frequency for antenna 40. Antenna 40 may also exhibit resonances at harmonic frequencies if desired.

Antenna resonating element 104 may be coupled to ground 102 by return path 110. Antenna ground 102 may be formed from metal components within device 10 such as one or more metal printed circuit board layers, metal housing structures (e.g., housing sidewall structures 12W, metal frame structures, metal bracket structures, metal midplate structures, etc.), any other desired conductive components within device 10, or any desired combination of these components. Antenna feed 112 may include positive antenna feed terminal 70 and ground antenna feed terminal 72 and may run in parallel to return path 110 between arm 104 and ground 102. If desired, antenna resonating element 104 of FIG. 4 may have more than one resonating arm branch (e.g., to create multiple frequency resonances to support operations in multiple communications bands) or may have other antenna structures (e.g., parasitic antenna resonating elements, tunable components to support antenna tuning, etc.). A planar inverted-F antenna (PIFA) may be formed by implementing antenna resonating element 104 using planar structures (e.g., a planar metal structure such as a metal patch or strip of metal that extends into the page of FIG. 4).

Figure 5:
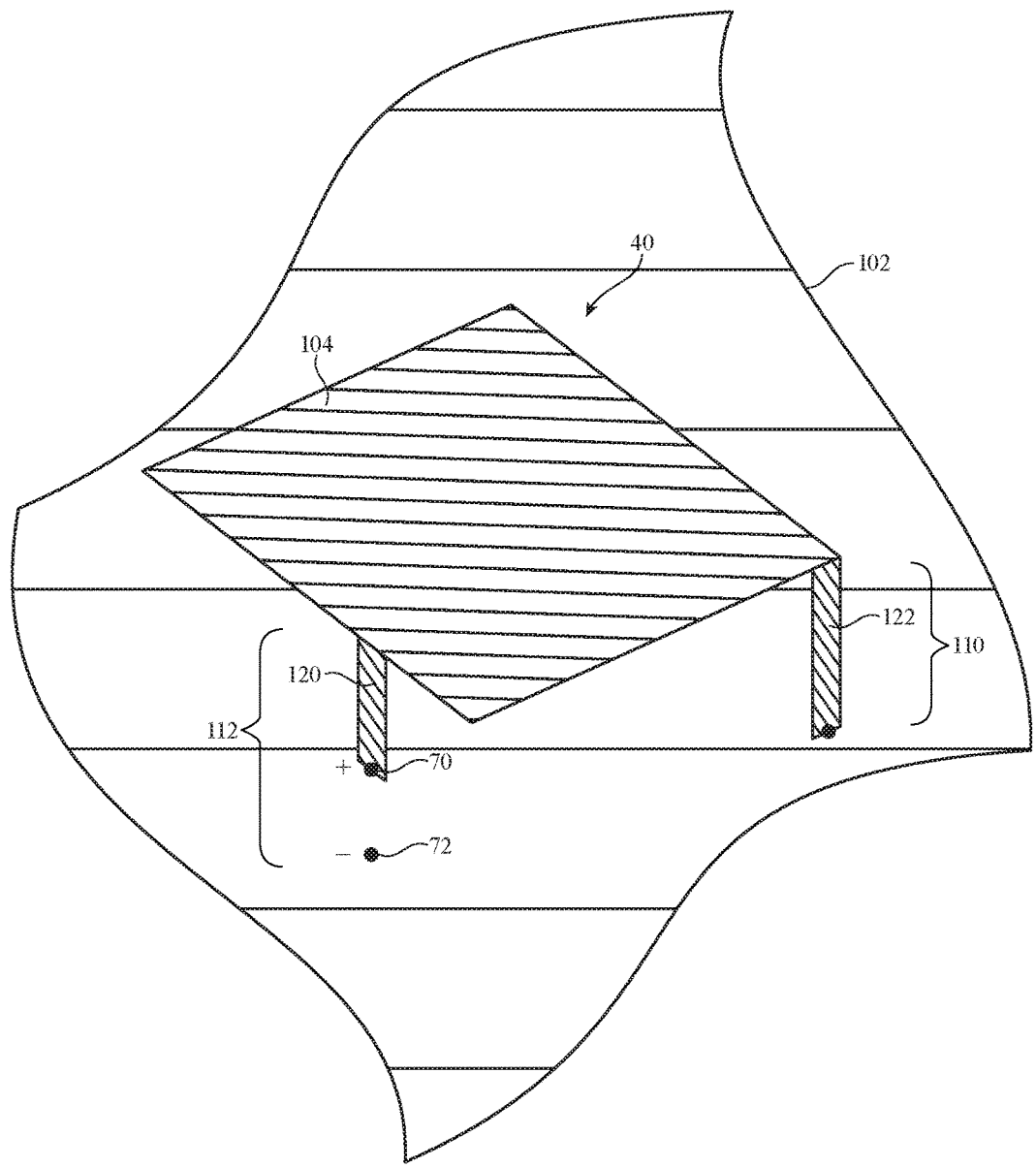
FIG. 5 is a perspective view showing how an illustrative antenna may include an antenna resonating element, an antenna ground, a return path, and an antenna feed (e.g., in a planar inverted-F antenna configuration) in accordance with an embodiment.

FIG. 5 is a perspective view of antenna 40 when antenna resonating element 104 is implemented using a planar metal structure such as a metal patch (e.g., when antenna 40 is implemented using a planar inverted-F structure). As shown in FIG. 5, antenna 40 may have an antenna feed such as feed 112 that includes a downwardly protruding feed leg such as leg 120. Positive antenna feed terminal 70 may be coupled to leg 120. If desired, feed leg 120 may be omitted and positive antenna feed terminal 70 may be directly connected to antenna resonating element 104. Ground antenna feed terminal 72 may be coupled to ground 102 and may be separated from positive antenna feed terminal 70 by a gap. Return path (short circuit path) 110 may be formed from downwardly protruding leg 122 that couples antenna resonating element structure 104 to ground plane 102. Structure 104 may be substantially or completely planar and may lie in a plane that is parallel to the plane of ground 102, if desired. In the example of FIG. 5, structure 104 has a rectangular plate shape. Configurations in which structure 104 has a meandering arm shape, shapes with multiple branches, one or more curved edges, one or more straight edges, or other shapes may also be used for forming antenna resonating element 104. Antenna resonating element 104 may be fed using other feeding schemes if desired (e.g., antenna resonating element 104 may be a resonating element in a patch antenna, monopole antenna, dipole antenna, slot antenna, loop antenna, etc.).

Figure 6:
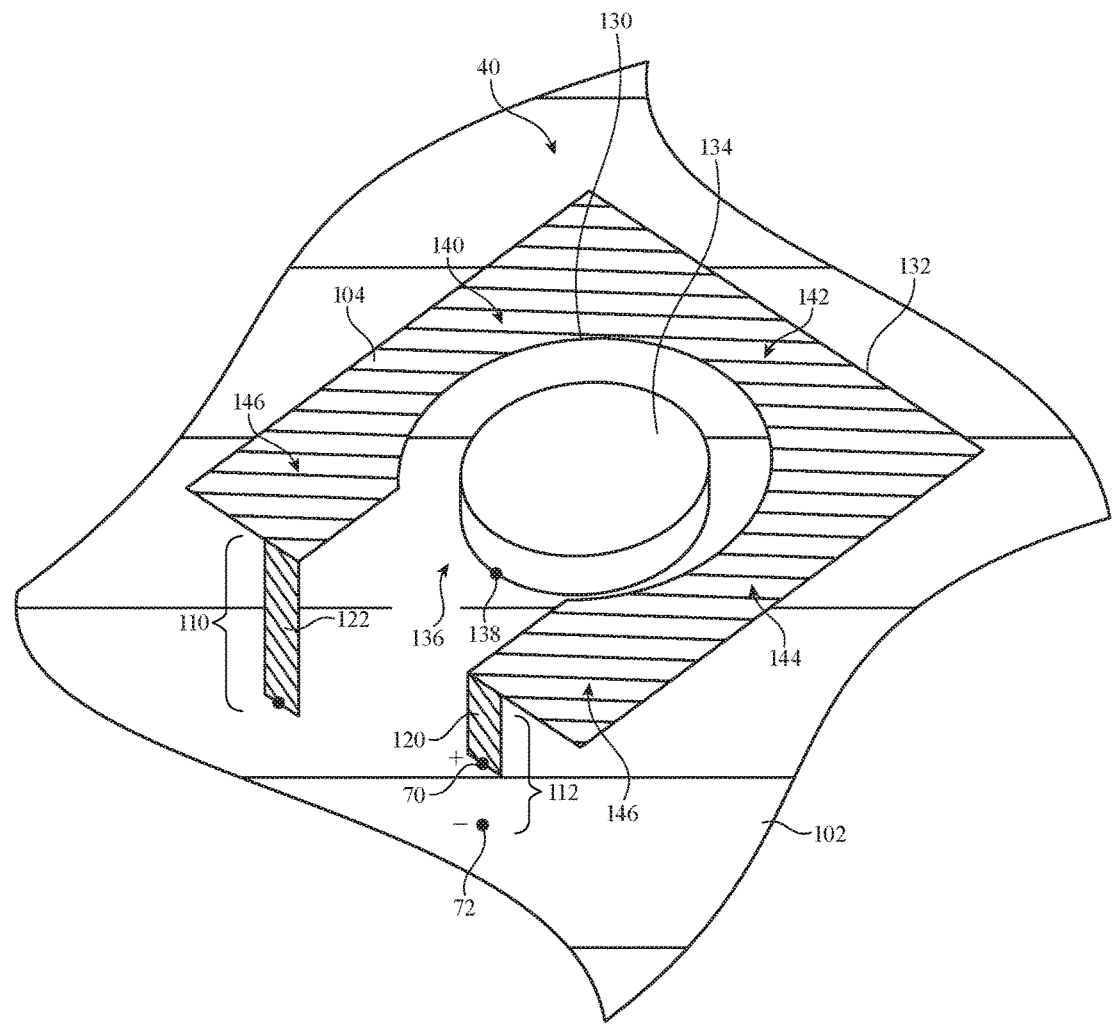
FIG. 6 is a perspective view showing how an illustrative antenna resonating element may have a slot that accommodates other device components in accordance with an embodiment.

As space is at a premium in device 10, antenna resonating element 104 may have a shape that is configured to accommodate other components within device 10. FIG. 6 is a perspective view of antenna 40 showing how antenna resonating element 104 may have a shape that accommodates other components within device 10.

As shown in FIG. 6, a notch or slot 136 may be formed in antenna resonating element 104. Slot 136 may be defined by interior edge 130 of resonating element 104 (e.g., slot 136 may be formed by a cut or notch extending from one side of outer edge 132 of antenna resonating element 104 towards the interior of antenna resonating element 104). Slot 136 may have a closed end defined by interior edge 130 of resonating element 104 and an opposing open end adjacent to feed leg 120 (i.e., slot 136 may sometimes be referred to as an open slot). In another suitable arrangement, slot 136 may be entirely enclosed by inner edge 130 (e.g., slot 136 may be a closed slot and planar antenna resonating element 104 may be continuous between feed leg 120 and return leg 122).

Slot 136 may have any desired perimeter or shape. In the example of FIG. 6, slot 136 has a curved (e.g., circular or oval) shape. The shape of slot 136 may accommodate other components such as components 134 that are placed within slot 136. If desired, the shape of slot 136 (i.e., interior edge 130) may be configured to conform to the shape of components 134 (e.g., the edges of internal components 134 may extend parallel to internal edge 130 of antenna resonating element 104). Components 134 may lie in a common plane with antenna resonating element 104 and/or may lie below the plane of antenna resonating element 104.

Internal components 134 may include one or more input-output devices 32 (FIG. 2), other antennas 40, coil 50, components from transceiver circuitry 90, a portion of control circuitry 28, portions of housing 12, or any other desired components. If desired, internal components 134 may include conductive components that are shorted to ground plane 102 (as shown by ground terminal 138).

When configured in this way, antenna resonating element 104 may have a first portion 140, a second portion 142 that extends substantially perpendicular to first portion 140, a third portion 144 that extends substantially perpendicular to second portion 142 (and parallel to first portion 140), and a fourth portion 146 that extends substantially perpendicular to third portion 144 (and parallel to second portion 144). First portion 140, second portion 142, and third portion 144 may surround three sides of components 134. Fourth portion 146 may be discontinuous (i.e., divided by slot 136).

Antenna feed 112 (e.g., antenna feed leg 120) and return path 110 (e.g., return leg 122) may be coupled to portion 146 of antenna resonating element 104. In the example of FIG. 6, feed leg 120 and return leg 122 are both coupled to portion 146 along exterior edge 132 and on opposing sides of slot 136. This is merely illustrative. If desired, feed leg 120 may be coupled to resonating element 104 at any desired location along portion 146 (e.g., along exterior edge 132, along interior edge 130, to a location between interior edge 130 and exterior edge 132, etc.). Return leg 122 may be coupled to resonating element 104 at any desired location along portion 146 (e.g., along exterior edge 132, along interior edge 130, to a location between interior edge 130 and exterior edge 132, etc.). If desired, feed leg 120 may be coupled to antenna resonating element 104 at any desired location along portion 144, 142, or 140. Similarly, return leg 120 may be coupled to antenna resonating element 104 at any desired location along portion 144, 142, or 140. In one suitable arrangement, feed leg 120 is coupled to resonating element 104 along portion 146 whereas return leg 122 is coupled to resonating element 104 at a location along exterior edge 132 of portion 140.

In the example of FIG. 6, exterior edge 132 of resonating element 104 has a rectangular shape (outline) whereas interior edge 130 has a curved shape. This is merely illustrative. In general, exterior edge 132 and interior edge 130 may have any desired shapes. For example, exterior edge 132 may have one or more curved sides, one or more straight sides, or more than four sides. Interior edge 130 may have one or more curved sides, one or more straight sides, etc. Resonating element 104 may have any desired number of portions extending in any desired directions. In the example of FIG. 6, antenna resonating element 104 is substantially planar. However, in general, antenna resonating element 104 may be formed on a surface having any desired shape. For example, antenna resonating element 104 may be formed on a concave or convex surface or may have a combination of flat, concave, and convex portions.

Figure 7:
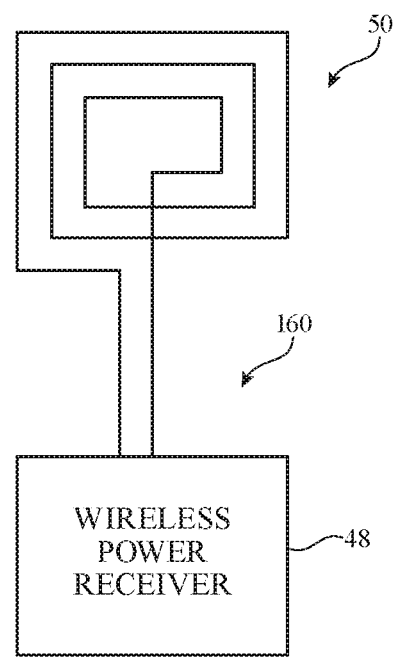
FIG. 7 is a schematic diagram of an illustrative wireless power coil in accordance with an embodiment.

FIG. 7 is a circuit diagram showing how wireless power receiver 48 of FIG. 2 may be coupled to coil 50. As shown in FIG. 7, wireless power receiver 48 may be coupled to coil 50 over conductive path 160. When receiving wireless power, coil 50 may receive wirelessly transmitted alternating-current signals that have been transmitted from a wireless power adapter or other wireless power transmitting device. The wirelessly transmitted alternating-current signals may induce current flow around the loops of coil 50. The induced current may be conveyed to wireless power receiver 48. Wireless power receiver 48 may have rectifier circuitry that rectifies the received alternating-current wireless power signals to produce direct-current power for device 10. The direct-current power may power any desired components of device 10 and/or may be used to charge a battery on device 10. Coil 50 may receive wireless power signals at any desired frequency. As an example, coil 50 may receive wireless power at frequencies in the range of 1 kHz to 100 MHz or other suitable frequencies. Wireless coil 50 may, if desired, be formed as a portion of components 134 within slot 136 of antenna resonating element 104 (FIG. 6).

Antenna resonating element 104 of FIG. 6 may be formed on a dielectric substrate. For example, a dielectric substrate such as a plastic carrier may be formed between ground plane 102 and antenna resonating element 104 for supporting antenna resonating element 104. In order to further conserve space within device 10, antenna resonating element 104 may, if desired, be formed from metal traces that are patterned directly onto a portion of housing 12 (e.g., onto dielectric rear housing wall 12R). If desired, some or all of components 134 that are surrounded by antenna resonating element 104 may be in contact with rear housing wall 12R. For example, coil 50 may be formed directly on rear housing wall 12R.

Figure 8:
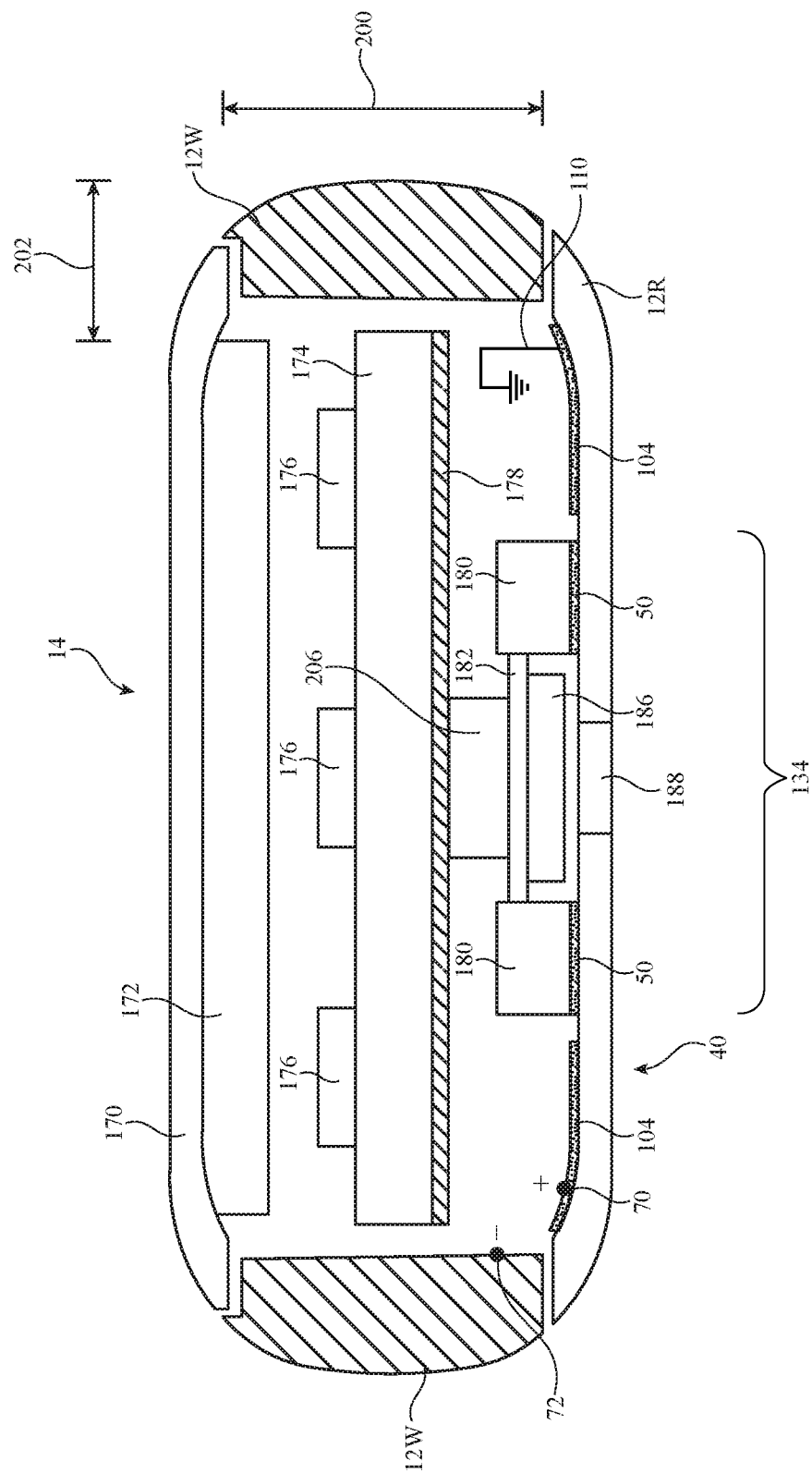
FIG. 8 is a cross-sectional side view of an illustrative electronic device having an antenna resonating element patterned directly onto a dielectric rear housing wall in accordance with an embodiment.

FIG. 8 is a cross-sectional side view of illustrative device 10 showing how antenna resonating element 104 may be patterned directly onto rear housing wall 12R. The plane of the page of FIG. 8 may be, for example, the X-Z plane or the Y-Z plane of FIG. 1.

As shown in FIG. 8, device 10 may have conductive housing sidewalls 12W that extend from the rear face to the front face of device 10. Display 14 may be formed at the front face of device 10 whereas dielectric rear housing wall 12R is formed at the rear face of device 10. Metal housing sidewalls 12W may be used in forming a portion of antenna ground 102 (FIG. 6) if desired. Display 14 may include a display cover layer 170 and a display module 172. Display module 172 may include active display components such as touch sensors, pixels, or other light-emitting components that emit light through display cover layer 170. Display cover layer 170 may extend across the length and width of device 10. Display cover layer 170 may include a transparent portion that passes the light emitted by display module 172 (e.g., so that the light may be seen by a user). If desired, an opaque masking layer such as an ink layer may be formed along the portion of display cover layer 170 that extends beyond display module 172 to hide the internal components of device 10 from view.

Device 10 may include printed circuit board structures such as printed circuit board 174. Printed circuit board 174 may be a rigid printed circuit board, a flexible printed circuit board, or may include both flexible and rigid printed circuit board structures. Printed circuit board 174 may sometimes be referred to herein as main logic board 174. Electrical components 176 may be mounted to main logic board 174. Electrical components 176 may include, for example, transceiver circuitry 90, one or more input-output devices 32, some or all of control circuitry 28 (FIG. 2), portions of housing 12, or any other desired components. Main logic board 174 may include one or more conductive layers such as conductive layer 178. Conductive layer 178 may, for example, form a portion of antenna ground 102 for antenna 40 (as shown in FIGS. 5 and 6). Conductive layer 178 may therefore sometimes be referred to herein as grounded layer 178, ground layer 178, ground conductor 178, or grounded conductor 178.

Conductive layer 178 may, if desired, be shorted (grounded) to metal housing sidewalls 12W. (e.g., antenna ground 102 may include conductive layer 178 and metal housing sidewalls 12W). Conductive layer 178 may be formed using metal foil, stamped sheet metal, conductive traces patterned onto a surface of main logic board 174, a conductive trace on a flexible printed circuit mounted to main logic board 174, or from any other desired conductive structures. If desired, conductive layer 178 may be formed (embedded) within main logic board 174 (e.g., conductive layer 178 may be stacked between dielectric layers of logic board 174). In another suitable arrangement, conductive layer 178 may be omitted.

As shown in FIG. 8, rear housing wall 12R may extend substantially across the length and width of device 10. Rear housing wall 12R may be formed from any desired dielectric material. For example, rear housing wall 12R may be formed from plastic, glass, sapphire, ceramic, wood, polymer, combinations of these materials, or any other desired dielectrics. Rear housing wall 12R may be optically opaque or optically transparent. Antenna resonating element 104 may be formed from conductive traces that are patterned directly onto the interior surface of dielectric housing wall 12R (e.g., the patterned conductive traces may be in direct contact with the inner surface of dielectric housing wall 12R). If desired, antenna resonating element 104 may be formed from conductive foil or other conductive structures that are placed in direct contact with rear housing wall 12R. Antenna resonating element traces 104 may be formed using any desired conductive material (e.g., aluminum, copper, metal alloys, stainless steel, gold, etc.). If desired, the rear housing wall of device 10 may include a combination of conductive and dielectric materials. For example, a portion of the rear housing wall may be formed from metal whereas another portion of the rear housing wall is formed from dielectric (e.g., the portion of the rear housing wall formed from dielectric may extend across some but not all of the length and width of device 10). The dielectric portion of the rear housing wall may, for example, include a dielectric window in a conductive portion of the rear housing wall (e.g., the rear housing wall may include a metal frame for the dielectric portion of the rear housing wall or other structures that surround the dielectric portion of the rear housing wall).

Positive antenna feed terminal 70 of antenna feed 112 may be coupled to a portion of antenna resonating element traces 104 to feed radio-frequency antenna signals for antenna 40. Ground antenna feed terminal 72 may be coupled to antenna ground 102. In the example of FIG. 8, ground antenna feed terminal 72 is coupled to metal housing sidewall 12W. If desired, ground antenna feed terminal 72 may be coupled to conductive layer 178 or any other desired grounded structures. Another portion of antenna resonating element traces 104 may be shorted to antenna ground 102 by return path 110. Return path 110 may be coupled to housing sidewall 12W, may be coupled to conductive layer 178, or may be coupled to any other desired grounded structures.

By patterning antenna resonating element traces 104 directly onto rear housing wall 12R, rear housing wall 12R may serve as a mechanical support structure or carrier structure for antenna resonating element 104. Antenna resonating element traces 104 may conform to the shape of the interior surface of dielectric rear housing wall 12R. In the example of FIG. 8, the interior surface of dielectric rear housing wall 12R has a curved shape (e.g., to increase the total volume for components within device 10 relative to scenarios where the interior surface of wall 12R is flat). Antenna resonating element traces 104 may therefore be formed within a curved surface that is in direct contact with rear housing wall 12R. In another suitable arrangement, antenna resonating element traces 104 may be formed on a flexible printed circuit or other substrate that is placed in contact with (e.g., layered over) rear housing wall 12R. Antenna 40 may receive and/or transmit radio-frequency signals through rear housing wall 12R. Radio-frequency signals transmitted by antenna 40 may, for example, be shielded from electrical components 176 by conductive layer 178 and main logic board 174. Similarly, conductive layer 178 and main logic board 174 may shield antenna 40 from components 176, thereby mitigating electromagnetic interference between antenna 40 and components 176.

Components 134 may be mounted to rear housing wall 12R. Antenna resonating element trace 104 may surround or be formed around the periphery of components 134 at rear housing wall 12R. In the example of FIG. 8, coil 50 is formed on support structures 180 and placed in direct contact with rear housing wall 12R. Coil 50 and support structures 180 may be mounted to a substrate such as substrate 182. Coil 50 may receive wireless power (e.g., wireless charging signals) through dielectric rear housing wall 12R.

Substrate 182 may be a rigid or flexible printed circuit board or any other desired substrate. Substrate 182 may include conductive structures that are grounded to antenna ground 102 if desired. For example, conductive foam 206 may be placed on substrate 182 to short conductive structures on substrate 182 to conductive layer 178 (e.g., conductive foam 206 may form ground terminal 138 of FIG. 6). Conductive foam 206 may also provide mechanical support to substrate 182 (e.g., by maintaining a separation between substrate 182 and main logic board 174). Other components such as sensor circuitry 186 may be mounted to substrate 182. Sensor circuitry 186 may include one or more sensors (e.g., sensors of input-output devices 32 of FIG. 2). The sensors may include touch sensors, proximity sensors (e.g., capacitive proximity sensors), light sensors, or any other desired sensors.

If desired, rear wall 12R may have one or more openings that are filled with an optically transparent window such as window 188 (e.g., in scenarios where rear housing wall 12R is optically opaque). Light-based sensor components 186 may be mounted in alignment with windows such as window 188. Components 186 may include light-emitting diodes (e.g., infrared light-emitting diodes, visible light-emitting diodes, etc.) and may include light detectors (e.g., detectors for detecting light that has been emitted by the light-emitting diodes after reflection off an external object). Configurations such as these may allow light-based components 186 to be used to monitor a user's physiological parameters (heart rate, blood oxygen level, etc.). In another suitable arrangement, conductive electrodes may be formed within openings in rear housing wall 12R. The conductive electrodes may sense changes in capacitance associated with the approach of an external object (e.g., a user's body) or may sense when the external object is in contact with rear housing wall 12R, for example. In general, any desired number of sensors may be aligned with any desired number of windows 188 or openings in rear housing wall 12R (e.g., one window 188, two windows 188, three windows 188, four windows 188, more than four windows 188, etc.). Components 186 and windows 188 may be surrounded by coil 50 and antenna resonating element traces 104 at rear housing wall 12R.

By patterning antenna resonating element traces 104 directly onto the interior surface of rear housing wall 12R, vertical height 200 of device 10 may be shorter than would otherwise be possible in scenarios where the antenna resonating element is located elsewhere on device 10 (while still allowing antenna 40 to exhibit satisfactory antenna efficiency). As an example, vertical height 200 may be less than or equal to 11.4 mm, less than 15 mm, between 8 and 11.4 mm, or any other desired height while still allowing antenna 40 to operate with satisfactory antenna efficiency. Forming antenna 40 along the rear side of device 10 may also allow for reduction of the size of the inactive region of display 14 (as shown by arrow 202), because antenna 40 can transmit radio-frequency signals through the rear side of device 10 without concern that the signals will be blocked by display module 172. Forming antenna traces 104 on rear housing wall 12R may also allow the perimeter of antenna resonating element 104 to be sufficiently large so as to allow for coverage of relatively low frequencies such as frequencies in a cellular telephone band between 700 and 960 MHz. Antenna 40 may thereby be used to cover radio-frequency signals in any desired number of communications bands between a low frequency such as 700 MHz and a high frequency such as 5.0 GHz or any other suitable frequency, for example.

Figure 9:
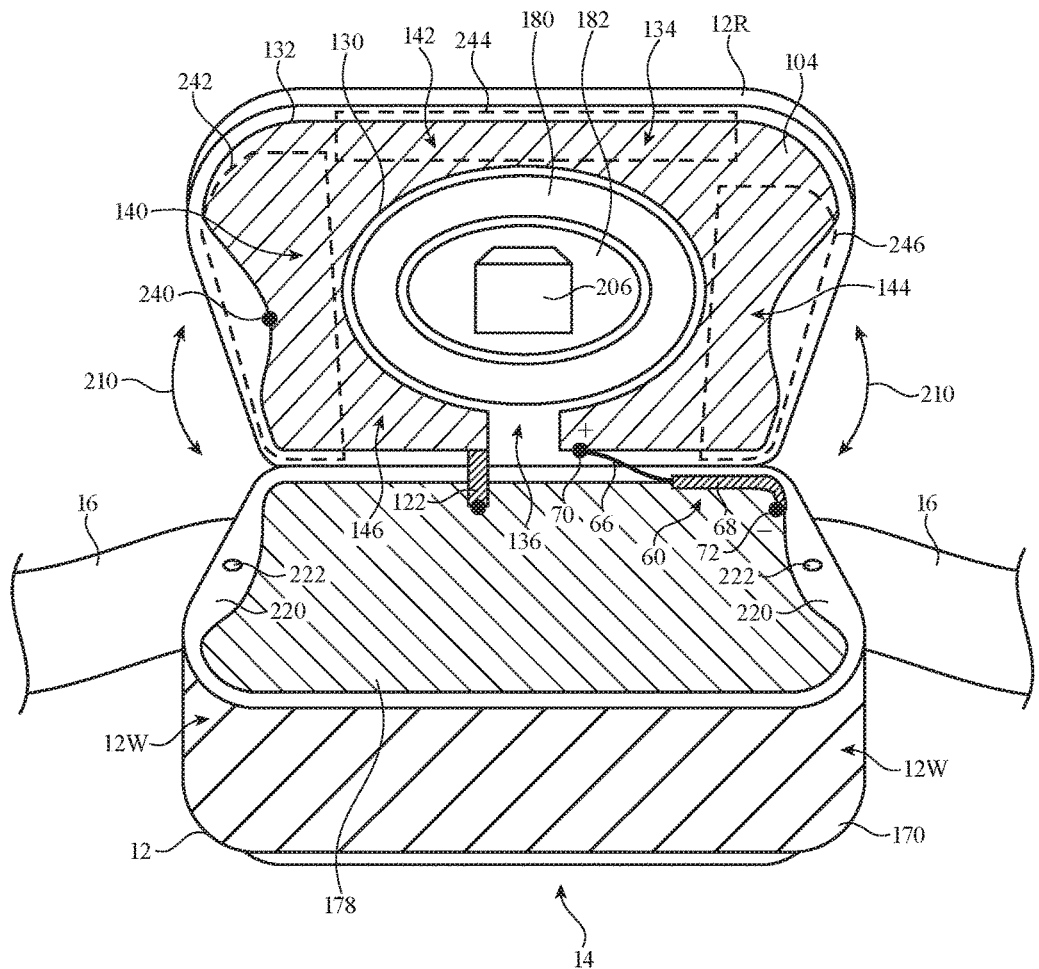
FIG. 9 is a perspective rear view of an illustrative electronic device from which a dielectric rear housing wall has been removed to show how an antenna resonating element may be patterned directly onto the dielectric rear housing wall in accordance with an embodiment.

FIG. 9 is a perspective rear view of device 10 showing how antenna resonating element 104 may be patterned directly onto rear housing wall 12R. In the perspective view of FIG. 9, rear housing wall 12R has been removed from device 10 (e.g., one end of rear housing wall 12R has been rotated upwards off of housing sidewalls 12W as shown by arrows 210) to expose the components within device 10. When device 10 is fully assembled, rear housing wall 12R may be mounted onto sidewalls 12W so that rear housing wall 12R lies flush with the bottom edges of sidewalls 12W.

As shown in FIG. 9, antenna resonating element trace 104 is patterned directly onto the interior surface of dielectric rear housing wall 12R. Components 134 (e.g., support structure 180, substrate 182, sensors 186, and conductive foam 206) may be mounted to the interior surface of rear housing wall 12R. Interior edge 130 of antenna resonating element trace 104 may be curved to accommodate components 134. For example, antenna resonating element trace 104 may surround at least three sides of components 134 at dielectric rear housing wall 12R. In one suitable arrangement, conductive coil 50 (FIG. 7) may follow the outline of support structure 180 to loop around conductive foam 206. In another suitable arrangement, conductive coil 50 may loop around support structure 180 (e.g., several turns of coil 50 may loop around some or all of support structure 180 so that support structure 180 forms a core for the coil). In this scenario, support structure 180 may, if desired, be formed from a conductive or magnetic core material that enhances the electromagnetic properties of coil 50.

When rear housing wall 12R is closed (e.g., by lowering wall 12R onto sidewalls 12W as shown by arrows 210), conductive foam 206 may come into contact with conductive layer 178 on main logic board 174. In scenarios where layer 178 forms a portion of antenna ground 102, conductive foam 206 may thereby form short circuit connection 138 between substrate 182 of components 134 and antenna ground 102 (FIG. 6). Antenna resonating element trace 104 may be shorted to conductive layer 178 via return leg 122. Return leg 122 may be a sheet of conductive material such as conductive foil or a conductive trace on a flexible printed circuit board, as examples. In another suitable arrangement, return leg 122 may be formed from a conductive spring structure. In yet another suitable arrangement, return leg 122 may be omitted and antenna resonating element 104 may be directly connected to conductor 178 (e.g., using solder or welds). When radio-frequency signals are fed to antenna resonating element trace 104 by transmission line 60, antenna currents may be conveyed through portions 146, 144, 142, and 140 of antenna resonating element trace 104 and may be shorted to conductive layer 178 (e.g., antenna ground 102) over return path 122. Conductive layer 178 may be shorted to housing sidewalls 12W at one or more locations so that sidewalls 12W and conductive layer 178 collectively form antenna ground 102 of FIG. 6.

Transmission line 60 may be coupled to antenna resonating element trace 104 at positive antenna feed terminal 70 (e.g., signal conductor 66 of transmission line 60 may be coupled to positive antenna feed terminal 70). Transmission line 60 may be coupled to conductive layer 178 at ground antenna feed terminal 72 (e.g., ground conductor 68 of transmission line 60 may be coupled to ground antenna feed terminal 72). This example is merely illustrative. In general, positive antenna feed terminal 70 may be coupled to antenna resonating element trace 104 at any desired location. Ground antenna feed terminal 72 may be coupled to conductive layer 178 at any desired location or may be directly connected to metal housing sidewall 12W. In an example where transmission line 60 is a coaxial cable, ground conductor 68 may be a braided outer conductor whereas signal conductor 66 is an inner signal conductor that is surrounded by outer conductor 68. In general, transmission line 60 may be any desired radio-frequency transmission line structure. If desired, signal conductor 66 and antenna feed terminal 70 may be coupled to a feed leg that is coupled to antenna resonating element trace 104.

Metal housing sidewalls 12W may include mounting structures 220. Mounting structures 220 may be metal frame structures, metal ledges, metal extensions, or other structures that are used to mount rear housing wall 12R to housing sidewalls 12W. Mounting structures 220 may have alignment structures such as holes 222. When rear housing wall 12R is placed over sidewalls 12W (e.g., when rear wall 12R is lowered in the direction of arrows 210), screws or other attachment mechanisms may pass through holes 222 for securing rear housing wall 12R to side walls 12W. The attachment mechanisms may also serve to short sidewalls 12W to conductive layer 178 if desired.

If desired, exterior edge 132 along one or more sides of antenna resonating element trace 104 may have a curved shape that accommodates the shape of mounting structures 220. In the example of FIG. 9, the exterior edge 132 of portions 140 and 144 may have a curved shape that accommodates the shape of mounting structures 220. The curved shape of exterior edge 132 along portions 140 and 144 may prevent antenna resonating element 104 from being shorted to metal housing walls 12W when rear housing wall 12R is placed over conductive sidewalls 12W.

Mounting structures 220 may be formed along one, two, three, or all four sides of housing sidewalls 12W. If desired, antenna resonating element trace 104 may extend across all of the area on the interior surface of dielectric rear housing wall 12R that is not otherwise occupied by components 134 and that is not in contact with the bottom side of sidewalls 12W (e.g., mounting structures 220) when device 12R is placed in contact with sidewalls 12W. In this way, the area of the antenna resonating element may be maximized to optimize antenna performance without shorting the antenna resonating element to ground at locations other than return leg 122.

In the example of FIG. 9, antenna resonating element trace 104 forms a conductive loop (ring) from antenna feed terminal 70 to return leg 122 (e.g., a loop that extends from trace portion 146 to the right of notch 136 to trace portion 144, trace portion 142, trace portion 140, and trace portion 146 to the left of notch 136). In other words, return leg 122 and feed terminal 70 may be formed on opposing ends of the conductive loop formed by resonating element trace 104. This example is merely illustrative. In general, return leg 122 may be coupled to antenna resonating element trace 104 at any other desired location.

In one suitable arrangement, return leg 122 may be coupled to antenna resonating element trace 104 along a side of device 10 that is coupled to a strap 16. For example, return leg 122 may be coupled to portion 140 of antenna resonating element 104 at a location such as location 240. When rear housing 12R is secured to sidewalls 12W, location 240 may be adjacent to the side of device 10 to which strap 16 is connected (e.g., side 8 of FIG. 1). Placing return leg 122 at a location such as location 240 may minimize electromagnetic loading of antenna 40 by strap 16 (and any corresponding deterioration in antenna efficiency) in scenarios where strap 16 is formed from metal or other conductive materials.

The example of FIG. 9 is merely illustrative. In general, antenna resonating element trace 104 may have any desired shape and may extend across any desired portions of rear housing wall 12R. In general, antenna resonating element trace 104 need not surround components 180, 182, and 206 on rear housing wall 12R. For example, antenna resonating element trace 104 may be formed within region 242, region 244, region 246, combinations of these regions, or any other desired region of rear housing wall 12R adjacent to the periphery of components 134. If desired, components 134 may be formed at other locations along rear housing wall 12R such as in regions 242, 244, 246, a combination of these regions, or other regions. Other feeding arrangements may be used if desired. For example, ground antenna feed terminal 72 may be coupled (e.g., directly connected) to antenna resonating element trace 104 instead of grounded conductor 178. Ground antenna feed terminal 72 may be coupled to antenna resonating element trace 104 along portion 146, 140, 142, or 144. If desired, return leg 122 may be omitted in scenarios where ground antenna feed terminal 72 is coupled to antenna resonating element 104.

If desired, tunable components such as tunable components 62 of FIG. 3 may be coupled to antenna 40 at any desired locations for adjusting the performance and/or resonant frequency of antenna 40. Tunable components 62 may, if desired, include adjustable matching circuitry coupled between transmission line 60 and antenna resonating element trace 104 or at any other desired location.

When configured in this way, antenna 40 may cover any desired frequency bands of interest, including cellular frequencies within a cellular telephone communications band from 700-960 MHz. In general, antenna 40 may handle radio-frequency signals above 700 MHz, such as signals at 2.4 GHz and/or 5 GHz for IEEE 802.11 communications, Bluetooth®, and/or other wireless local area network communications may be handled by peripheral antenna 40P (as an example), low band cellular telephone signals (e.g., cellular telephone communications at frequencies between 700 MHz and 960 MHz), cellular telephone signals and GPS signals in a mid-band, a high band, and other bands that are above 960 MHz such as cellular telephone and GPS signals at 960-2700 MHz, radio-frequency signals at 2.4 GHz and/or 5 GHz for IEEE 802.11 communications, Bluetooth®, and/or other wireless local area network communications, and any other desired bands. By covering all of these bands using a single antenna 40, the space that would have otherwise been occupied by additional antennas within device 10 may be used for other electronic device components or to further reduce the size (e.g., dimension 200 and/or 202 of FIG. 8) of device 10 without sacrificing antenna efficiency.

If desired, control circuitry 28 may adjust tunable components 62 to cover the desired bands of interest and to compensate for any detuning of antenna 40 due to loading of the antenna by external objects. If desired, control circuitry 28 may adjust the tunable components based on instructions received from external equipment such as a wireless base station or access point. Control circuitry 28 may adjust the tunable components based on the current operating state of device 10. For example, control circuitry 28 may identify a usage scenario (e.g., whether device 10 is being used to browse the internet, conduct a phone call, send an email, access GPS, etc.) to determine how to adjust tunable components 62. As another example, control circuitry 28 may identify sensor data that is used to identify how to adjust tunable components 62 (e.g., optical sensor data, proximity sensor data, touch sensor data, data indicative of how close a user's body is to rear housing wall 12R, impedance sensor data that is gathered by obtaining antenna impedance measurements from antenna 40 or other antennas in device 10, etc.). In general, control circuitry 28 may process any desired combination of this information (e.g., information about a usage scenario of device 10, sensor data, information from a wireless base station, user input, etc.) to identify how to adjust tunable components 62.

In practice, the performance of antenna 40 may be optimized by the presence of an external object adjacent to rear housing wall 12R. For example, the presence of a user's wrist adjacent to rear housing wall 12R when the user is wearing device 10 may enhance the performance of antenna 40.

Figure 10:
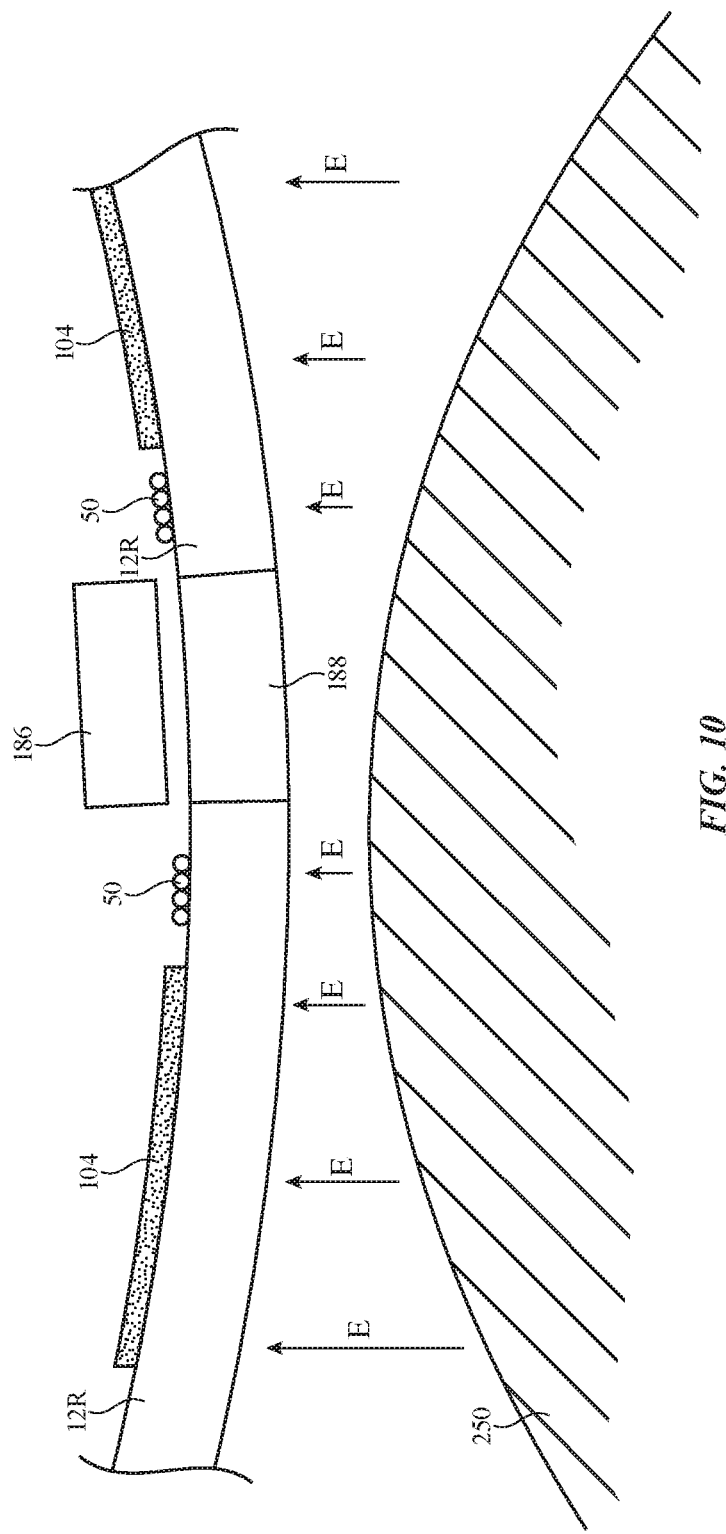
FIG. 10 is a cross-sectional side view of a rear portion of an illustrative electronic device when placed over a user's wrist in accordance with an embodiment.

Consider, as an example, the side view of the rear of device 10 of FIG. 10. In a configuration of the type shown in FIG. 10, dielectric rear housing wall 12R may have a curved/circular shape or other shape that allows rear wall 12R to be received within other portions of housing 12 (e.g., by metal housing sidewalls 12W). Coil 50 may be formed from loops of conductive wire, loops of metal traces on a printed circuit, or other loops of conductive signal paths. Coil 50 may be placed into direct contact with the interior surface of rear housing wall 12R. Antenna resonating element traces 104 may be patterned directly onto the interior surface of rear housing wall 12R and may surround coil 50. Rear housing wall 12R may have a curved outer surface that rests against a user's body (e.g., wrist 250) when device 10 is worn by a user. If desired, rear wall 12R may have an opening with one or more transparent windows such as window 188. Light-based components such as sensors 186 may be mounted in alignment with windows such as window 188.

During operation, antenna resonating element 104 may transmit and/or receive radio-frequency signals having electric fields that are oriented normal to the surfaces of rear face 12R and wrist 180. These signals may sometimes be referred to as surface waves, which are then propagated along the surface of wrist 250 and outwards (e.g., antenna resonating element traces 104 and wrist 250 may serve as a waveguide that directs the surface waves outwards).

Figure 11:
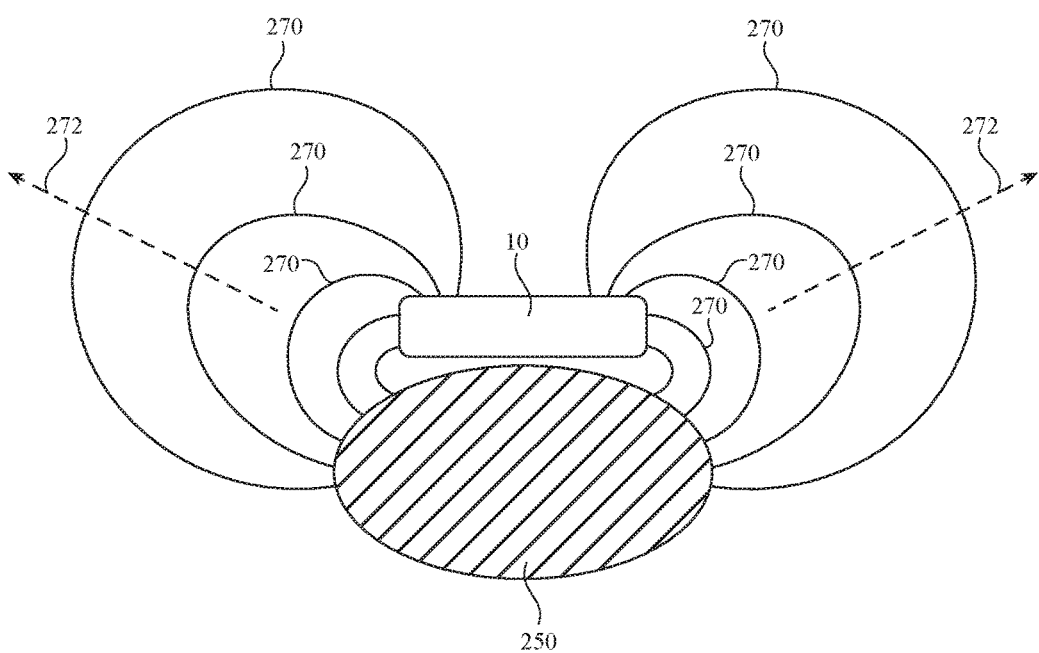
FIG. 11 is a cross-sectional side view of an illustrative electronic device showing how an antenna resonating element at the rear of the device and a user's wrist may guide electromagnetic energy away from the device in accordance with an embodiment.

FIG. 11 is a cross-sectional side view showing how the electromagnetic signals generated by antenna 40 may be propagated outwards due to the presence of the user's wrist. As shown in FIG. 11, contour lines 270 indicate contours of constant electric field magnitude. The magnitude of the electric field generated by antenna 40 is highest in the space between device 10 and wrist 250. The signals may propagate along resonating element trace 104 and the surface of wrist 250 in an outward direction away from device 10, as shown by paths 272. This may allow the signals to be properly received by external communications equipment even though antenna 40 is located close to wrist 250. In practice, the presence of wrist 250 may even serve to enhance the propagation of the electromagnetic waves relative to situations when wrist 250 is not present. For example, the radio-frequency signals emitted by antenna 40 may not be properly directed in the absence of wrist 250, resulting in poor or unsatisfactory wireless link quality with the external equipment. However, in the presence of wrist 250, the signals may be properly directed as shown by arrows 272, thereby allowing for a satisfactory link quality to be obtained. The example of FIG. 11 is merely illustrative. In general, the electric field patterns may have any desired shape or configuration.

The foregoing is merely illustrative and various modifications can be made to the described embodiments. The foregoing embodiments may be implemented individually or in any combination.

What is claimed is:
1. An electronic device having opposing front and rear faces, the electronic device comprising:

a dielectric rear housing wall that forms the rear face of the electronic device;
a display having a display cover layer that forms the front face of the electronic device;
a coil on the dielectric rear housing wall;
wireless power receiver circuitry that uses the coil to receive wireless power signals through the dielectric rear housing wall;
an antenna resonating element formed from conductive traces on the dielectric rear housing wall, the conductive traces surrounding the coil at the dielectric rear housing wall; and
radio-frequency transceiver circuitry that is coupled to the conductive traces of the antenna resonating element and that is configured to transmit and receive radio-frequency signals through the dielectric rear housing wall using the antenna resonating element.

2. The electronic device defined in claim 1, wherein the coil contacts the dielectric rear housing wall.

3. The electronic device defined in claim 1, further comprising:
a sensor mounted to the dielectric rear housing wall, wherein the conductive traces of the antenna resonating element surround three sides of the sensor at the dielectric rear housing wall.

4. The electronic device defined in claim 3, wherein the dielectric rear housing wall is opaque, the electronic device further comprising:
an optically transparent window in the dielectric rear housing wall, wherein the sensor is aligned with the optically transparent window and is configured to receive light through the optically transparent window.

5. The electronic device defined in claim 1, further comprising:
a printed circuit board having a conductive layer; and
a return path that shorts the antenna resonating element to the conductive layer.

6. The electronic device defined in claim 5, further comprising:
conductive housing sidewalls that extend from the dielectric rear housing wall to the display cover layer, wherein the conductive housing sidewalls are shorted to the conductive layer.

7. The electronic device defined in claim 5, further comprising:
a positive antenna feed terminal coupled to the conductive traces of the antenna resonating element;
a ground antenna feed terminal coupled to the conductive layer; and
a radio-frequency transmission line having a signal conductor coupled between the radio-frequency transceiver circuitry and the positive antenna feed terminal and a ground conductor coupled between the radio-frequency transceiver circuitry and the ground antenna feed terminal.

8. The electronic device defined in claim 7, wherein the conductive traces of the antenna resonating element form a conductive loop having opposing first and second ends, the positive antenna feed terminal is coupled to the conductive traces at the first end of the conductive loop, and the return path is coupled to the conductive traces at the second end of the conductive loop.

9. The electronic device defined in claim 5, further comprising:
a conductive housing sidewall that is configured to receive a strap for the electronic device, wherein the return path is coupled to the conductive traces at a location adjacent to the conductive housing sidewall.

10. The electronic device defined in claim 1, further comprising:
a flexible printed circuit formed over and in contact with the dielectric rear housing wall, wherein the conductive traces are formed on the flexible printed circuit.

11. An electronic device having opposing front and rear faces, the electronic device comprising:
a display at the front face of the electronic device;
a housing having a dielectric rear wall at the rear face of the electronic device and having a metal sidewall, wherein the dielectric rear wall has an interior surface that defines an interior of the electronic device and the metal sidewall forms at least part of an antenna ground for an antenna;
conductive traces that form a planar antenna resonating element for the antenna, wherein the conductive traces are patterned onto the interior surface of the dielectric rear wall of the housing;
a feed for the antenna that includes a first antenna feed terminal coupled to the conductive traces and a second antenna feed terminal coupled to the antenna ground;
radio-frequency transceiver circuitry; and
a radio-frequency transmission line that couples the radio-frequency transceiver circuitry to the first and second antenna feed terminals, wherein the radio-frequency transceiver circuitry is configured to transmit and receive radio-frequency signals through the dielectric rear wall of the housing using the antenna.

12. The electronic device defined in claim 11, wherein the radio-frequency transceiver circuitry comprises:
wireless local area network transceiver circuitry that is configured to transmit and receive wireless local area network signals through the dielectric rear wall of the housing using the antenna; and
satellite navigation receiver circuitry that is configured to receive satellite navigation signals through the dielectric rear wall of the housing using the antenna.

13. The electronic device defined in claim 12, further comprising:
a cellular telephone transceiver that is configured to transmit and receive signals from 700 MHz to 960 MHz through the dielectric rear wall of the housing using the antenna.

14. The electronic device defined in claim 11, further comprising:
a coil; and
wireless power receiver circuitry that uses the coil to receive wireless power signals through the dielectric rear wall of the housing.

15. The electronic device defined in claim 14, wherein the coil is mounted to a substrate, the electronic device further comprising:
a printed circuit board;
a conductive layer formed on the printed circuit board; and
conductive foam coupled between the substrate and the printed circuit board, wherein the conductive foam is configured to short conductive structures on the substrate to the conductive layer on the printed circuit board.

16. The electronic device defined in claim 11, further comprising:
adjustable tuning circuitry coupled to the antenna;
a sensor that is configured to generate sensor data; and control circuitry that is configured to process the sensor data and adjust the tuning circuitry to tune the antenna based on the sensor data.

17. An electronic device having opposing first and second faces, the electronic device comprising:
   a housing having a dielectric wall at the second face and having sidewalls that extend from the dielectric wall to the first face;
   an antenna, wherein the antenna comprises:
      an antenna ground,
      an antenna resonating element formed from conductive traces that are patterned directly onto the dielectric wall and that define a slot,
      a first antenna feed terminal coupled to the conductive traces, and
      a second antenna feed terminal coupled to the antenna ground;
   sensor circuitry mounted to the dielectric wall within the slot defined by the conductive traces, wherein the sensor circuitry is configured to receive light through the dielectric wall; and
   radio-frequency transceiver circuitry that is coupled to the first and second antenna feed terminals and that is configured to transmit and receive radio-frequency signals through the dielectric wall using the antenna.

18. The electronic device defined in claim 17, further comprising:
   a coil mounted to the dielectric wall within the slot; and
   wireless power receiver circuitry that uses the coil to receive wireless power signals through the dielectric wall.

19. The electronic device defined in claim 17, wherein the sidewalls of the housing comprise metal sidewalls, the electronic device further comprising:
   a printed circuit board having a conductive layer that is electrically coupled to the metal sidewalls; and
   a return path for the antenna that couples the conductive traces to the conductive layer, wherein antenna ground comprises the metal sidewalls and the conductive layer.

* * * * *